Feb. 14, 1950   G. B. BRUSTOLON ET AL   2,497,342
EGG SHELLER
Filed Oct. 15, 1946
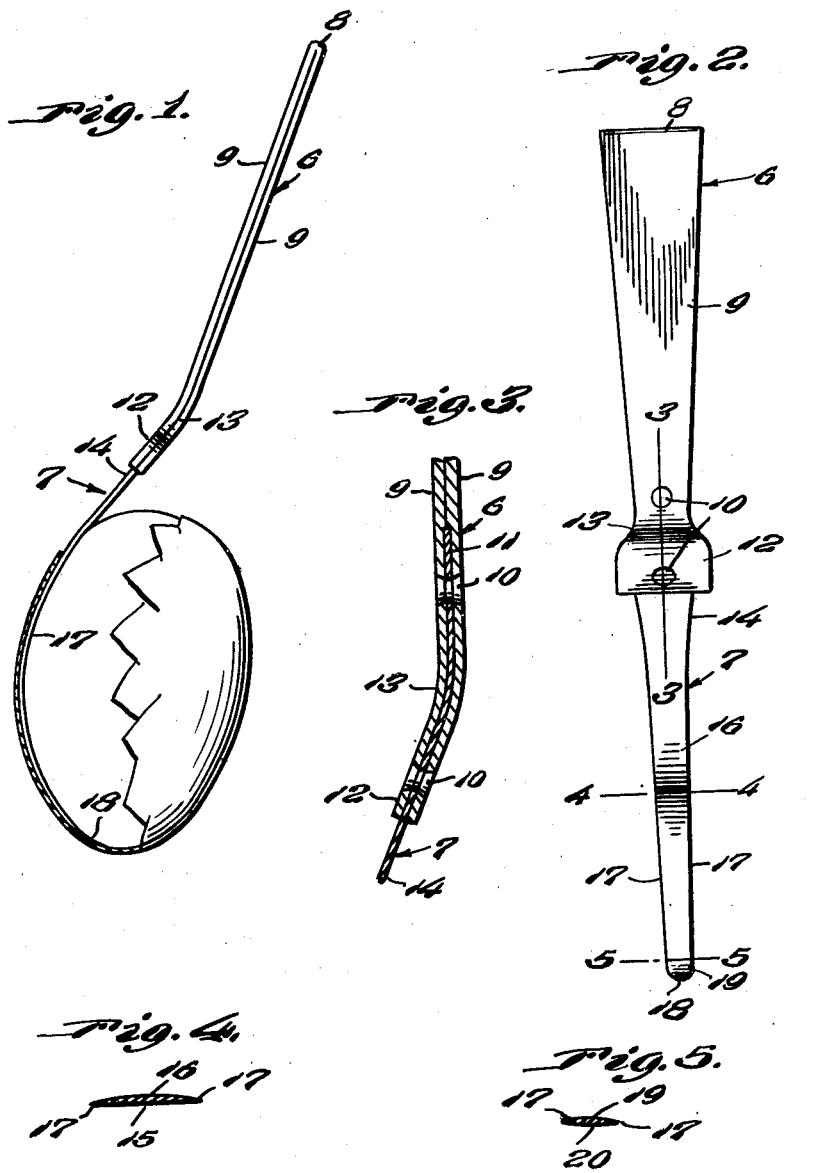
Inventors
George B. Brustolon
John E. Hoey
By Clarence A. O'Brien
and Harvey B. Jacobson
Attorneys Patented Feb. 14, 1950

2,497,342

UNITED STATES PATENT OFFICE 2,497,342

EGG SHELLER

George B. Brustolon and John E. Hoey, Groton, Conn.

Application October 15, 1946, Serial No. 703,352

2 Claims. (Cl. 30—356)

This invention relates to a novel egg sheller, that is, a simple device of a hand-manipulated type which is expressly suitable for use in removing a shell from a hard-boiled egg. Briefly, the embodiment of the invention herein depicted, described and claimed is characterized by a suitably proportioned and appropriately designed handle, said handle being provided at one end with a blade, the blade being of thin gage metal, reduced gradually in width from the inner toward the outer end and being highly flexible to conform to variable requirements during the period of use and provided with double-cutting edges to sever the usual membrane or skin from the white of the egg, this in a reliable and expeditious manner.

In carrying out the principles of the invention, we have evolved and produced, as a pioneer in this line of endeavor, a device implemented by requisite features to render same aptly useful in removing egg shells advantageously and in a manner to assure a clean job when the shelling step has been completed.

Of outstanding importance, in carrying out the principles of the invention, is the ever-effective and easy-to-handle blade, this being of thin gage, stainless steel of proper length and curvature, and provided at its free end with a penetrating point, along longitudinal edges, with properly feathered cutting edges and having proper cross-sectional shapes to solve the problems and overcome such conditions as are met.

Other objects, features and advantages of the invention will become more readily apparent from the following description and the drawings.

In the drawings, wherein like numerals are employed to designate like parts throughout the views:

Figure 1 is an edge elevational view of a so-called egg sheller constructed in accordance with the principles of the instant invention, showing the manner in which it is employed to accomplish the task.

Figure 2 is a side elevational view observing one face or side of the implement.

Figure 3 is a fragmentary longitudinal sectional view taken centrally on the plane of the line 3—3 of Figure 2.

Figures 4 and 5 are sections taken transversely on the lines 4—4 and 5—5 of Figure 2.

The preferred embodiment of the invention as depicted in the aforementioned figures is characterized essentially by two main parts; namely, handle means 6 and blade means 7. The handle may be of a form other than that illustrated but is preferably constructed as shown, that is, formed from strap metal of appropriate rigidity, the strap of metal being bent upon itself, as at 8, and the limbs 9 being brought together and riveted, as at the points 10. The rivets 10 serve to secure the shank portion 11 securely in place. The terminals of the limbs 9 are slightly widened, as at 12, to form a sort of enlarged head. This head may be used somewhat in the nature of a hammer, if desired, for cracking the butt end of the shell of a hard-boiled egg to puncture same and to provide for insertion and use of the blade means 7. Incidentally, the head portion 12 is slightly offset by bending, as at 13, in order to give the blade means an adaptable and appropriate position in relation to the axis of the handle.

Referring now to the blade means, it will be seen that this comprises a length of properly gaged stainless steel, the inner end portion 14 being substantially wide and the remainder of the blade being gradually decreased in width to provide the desired taper. Looking at the edge of the blade, that is, toward either edge, it will be seen that said blade is bowed longitudinally. The inherent resiliency of the metal is such as to give the blade a preformed curvature comparable, as it were, with the longitudinal curvature of the outer bulbous surface of the egg shell. We desire to stress the fact that the said blade is highly pliant and is thus possessed of adequate flexure properties to render it adaptable in conforming to the parts of the egg with which the blade coacts.

The cross-sectional shaping of the blade at different points is also a factor worthy of note. That is to say, the intermediate bend of the curvature blade is of the cross-section seen in Figure 4. Hence, one surface or face of the blade is substantially flat across, as at 15, while the opposite surface is convexed, as at 16. The longitudinal edges are "featheredged" to provide cutting edges 17. Through the rounded tip or penetration point 18, the metal of said blade is double convexed, that is, convexed on both sides, as at the points 19 and 20.

Reviewing the construction and description thereof, the following relevant factors will be full well appreciated to-wit:

The resultful purpose of the device disclosed is to facilitate, when properly used and handled, the removal of the shell of a hard-boiled egg.

Upon examination of the details of construction, it will be noted that the device, as described, consists of a very thin blade (.015 approximately), tapering from base to point slightly in thickness. It is curved to approximate conformity of an average egg. The cutting edges, it should be particularly noted, lie flush with the outer curvature of the blade. The inner side is slightly rounded to provide a minimum of bearing surface on the flesh of the egg. The outer side is flat, except near the point, where the blade is rounded or convexed on both sides to prevent puncture through the egg shell. The blade can be manufactured of spring or stainless steel. The handle can be manufactured of any suitable material.

Operation is effected by first cracking the shell with "hammer" 12, thus forming an aperture at one end of the egg. It will be found preferable to make this aperture at the blunt end, as this always exposes a large depression in the flesh of the egg, facilitating insertion of the blade.

The egg sheller should be introduced in conformance with the contours of the egg. When the egg sheller ceases to enter freely, it will indicate that it has reached its proper depth.

After introduction has been effected, the egg is rotated in the hand, while the egg sheller is held stationary with a slight upward tilt, with the upper edge facing the unseparated egg shell. After one complete revolution, the sheller is lifted against the egg shell, fracturing it the entire length. The egg shell can then be pushed off and the egg ejected.

A few trials will suffice to make an operator adept with this device.

The shelling accomplished with this device will be neater, more sanitary, more rapid, and more efficient than the usual practice of shelling by hand.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though we have herein shown and described a preferred embodiment of our invention that the same is susceptible to certain changes fully comprehended by the spirit of the invention as herein described and within the scope of the appended claims.

We claim:

1. An egg sheller of the class described comprising a handle provided at one end with a longitudinally bowed highly flexible stainless steel blade which is bendable lengthwise and axially twistable to adapt same to conform to variable contours between the white and shell of a hard-boiled egg, whereby to dislodge said white properly from the shell by severing the usual intervening membrane-skin, in a manner to facilitate quick and convenient skinning and removal of the shell, the free outer end of the blade being rounded in a transverse direction and the cross-section of said rounded end portion being such as to provide convex longitudinal surfaces on opposite sides, the intermediate portion of said blade being flat on one side and convex on the other side.

2. An egg sheller of the class described comprising a handle provided at one end with a longitudinally bowed highly flexible stainless steel blade which is bendable lengthwise and axially twistable to adapt same to conform to variable contours between the white and shell of a hard-boiled egg, whereby to dislodge said white properly from the shell by severing the usual intervening membrane-skin, in a manner to facilitate quick and convenient skinning and removal of the shell, the free outer end of the blade being rounded in a transverse direction and the cross-section of said rounded end portion being such as to provide convex longitudinal surfaces on opposite sides, the intermediate portion of said blade being flat on one side and convex on the other side, the longitudinal edge portions being featheredged to provide cutting edges and said blade being gradually decreased in width from the inner shank end toward said outer free end.

GEORGE B. BRUSTOLON.
JOHN E. HOEY.

REFERENCES CITED

The following references are of record in the file of this patent:

UNITED STATES PATENTS

| Number | Name | Date |
|---|---|---|
| D. 48,236 | Alvord | Nov. 30, 1915 |
| 2,370,440 | Beavin | Feb. 27, 1945 |

FOREIGN PATENTS

| Number | Country | Date |
|---|---|---|
| 752,762 | France | July 24, 1933 |